US011010478B2

(12) United States Patent
Paulraj et al.

(10) Patent No.: US 11,010,478 B2
(45) Date of Patent: May 18, 2021

(54) METHOD AND SYSTEM FOR MANAGEMENT OF SECURE BOOT CERTIFICATES

(71) Applicant: Dell Products L.P., Round Rock, TX (US)

(72) Inventors: Deepaganesh Paulraj, Bangalore (IN); Vinod Parackal Saby, Bangalore (IN); Ankit Singh, Bangalore (IN); Shinose Abdul Rahiman, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 162 days.

(21) Appl. No.: 16/404,278

(22) Filed: May 6, 2019

(65) Prior Publication Data

US 2020/0356672 A1 Nov. 12, 2020

(51) Int. Cl.
*G06F 21/57* (2013.01)
*G06F 9/455* (2018.01)
*H04L 29/06* (2006.01)

(52) U.S. Cl.
CPC ........ *G06F 21/575* (2013.01); *G06F 9/45558* (2013.01); *H04L 63/0823* (2013.01); *G06F 2009/45595* (2013.01)

(58) Field of Classification Search
CPC ............... G06F 21/575; G06F 9/45558; G06F 2009/45595; H04L 63/0823
See application file for complete search history.

(56) References Cited

U.S. PATENT DOCUMENTS

| 6,061,743 A * | 5/2000 | Thatcher | G06F 16/10 719/328 |
| 7,516,482 B2 * | 4/2009 | Wheeler | H04L 29/12066 380/277 |
| 2016/0232356 A1 * | 8/2016 | Barkelew | H04L 9/3268 |
| 2016/0378970 A1 * | 12/2016 | Campbell | G06F 21/575 726/17 |

* cited by examiner

*Primary Examiner* — Glenn A. Auve
(74) *Attorney, Agent, or Firm* — Baker Botts L.L.P.

(57) ABSTRACT

Methods, systems, and computer programs encoded on computer storage medium, for providing, by a client computing node, an interface identifying a secure boot certificate namespace hierarchy including a plurality of namespaces; in response to providing the interface, receiving, by the client computing node, a request to create a new namespace within the secure boot namespace hierarchy; configuring the new namespace, including adding a certificate that is to be included by the new namespace, the certificate associated with a server computing system; and assigning the new namespace to the server computing system.

18 Claims, 5 Drawing Sheets

METHOD AND SYSTEM FOR MANAGEMENT OF SECURE BOOT CERTIFICATES

BACKGROUND

Field of the Disclosure

The disclosure relates generally to information handling systems, and specifically, management of secure boot certificates used with information handling systems.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Currently, there are many software assets (e.g., certificates, policies, licenses, etc.) that are to be associated to a group/subset of entities (e.g., hardware entities (server)s or software entities (virtual machines)). If an entity is migrated or needs to be re-grouped, then the entity needs to be re-associated manually. However, this can cause problems; for example, currently the secure boot certificate is managed locally for each server computing system. Thus, managing the set of certificates in each server computing system can be difficult when managing a data center containing thousands of server computing systems. If the set of deployed certificates are not the same across each of the server computing systems, it can take a great deal of effort to selectively configure the certificates for each unique set of server computing systems. Further, if any server computing systems are offline while updating the secure boot certificates remotely, then the certificates will be out of sync and will have to be configured individually to be in sync with other server computing systems. Currently, there is no version or identifier associated with a snapshot of the secure boot certificate store. Additionally, as all of the certificates are locally copied in each server computing system, introducing a new set of certificates or removing a set of certificates from the existing systems in a data center can be a large undertaking. As a result, unwanted certificates can be left behind in the secure boot certificate store which may result in malicious attacks or if required certificates are not present, the operating system will not load. Moreover, if a server computing system is moved to a new location or configuration, then the secure boot certificates may require reconfiguration according to the new location or configuration or policy. Failure to update the secure boot certificates may result in load failure of the operating system.

SUMMARY

Innovative aspects of the subject matter described in this specification may be embodied in a method including providing, by a client computing node, an interface identifying a secure boot certificate namespace hierarchy including a plurality of namespaces; in response to providing the interface, receiving, by the client computing node, a request to create a new namespace within the secure boot namespace hierarchy; configuring the new namespace, including adding a certificate that is to be included by the new namespace, the certificate associated with a server computing system; and assigning the new namespace to the server computing system.

Other embodiments of these aspects include corresponding system, apparatus, and computer programs, configured to perform the actions of the methods, encoded on computer storage devices.

These and other embodiments may each optionally include one or more of the following features. For instance, in response to the request, forwarding, by the client computing node, the request to a mining computing node. Querying, by the server computing system, an effective certificate for the new namespace; receiving, by the mining computing node, the query for the effective certificate for the new namespace; recursively obtaining, by the mining computing node, a set of secure boot certificates of the secure boot namespace hierarchy; and deriving, by the mining computing node, the effective certificate from the set of secure boot certificates. Providing, by the mining computing node, the effective certificate to the client computing node; providing, by the client computing node, the effective certificate to the server computing system; and in response to receiving the effective certificate, validating, by the server computing system, drivers against the effective certificate and boot an operating system of the server computing system. The effective certificate is derived based on a cardinality value and an override procedure of the secure boot certificate namespace hierarchy. The request can include a request to update certificates within the secure boot namespace hierarchy. Configuring the new namespace, including adding a certificate that is to be included by the new namespace, the certificate associated with a virtual machine; and assigning the new namespace to the virtual machine.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

This document describes a system and method for management of secure boot certificates. Specifically, an interface is provided by a client computing node that identifies a secure boot certificate namespace hierarchy which includes a plurality of namespaces. In response to providing the interface, a request is received by the client computing node to create a new namespace within the secure boot namespace hierarchy. The new namespace is configured, including adding a certificate that is to be included by the new namespace. The certificate can be associated with a server computing system. The new namespace can be assigned to the server computing system.

Specifically, the secure boot certificate namespace can be managed in a distributed manner and the certificates are managed through the namespace hierarchy. Thus, once the namespace is associated to the server computing system, effective certificates are received automatically. Further, when an offline server computing system becomes online, the server computing system can receive the effective certificate from the distributed pre-configured certificate namespace automatically—thus, always being in-sync. Additionally, if a certificate is added in the parent namespace, the namespace hierarchy ensures that the certificate is part of the child namespace(s) as well. Moreover, each server computing system can be associated with any one of available certificate namespaces. If a server computing system is configured with a new location, then the server computing system is assigned with a new certificate namespace. Thus, the server computing system receives a new set of effective secure boot certificates based on the new location.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-7 wherein like numbers are used to indicate like and corresponding parts.

Figure 1:
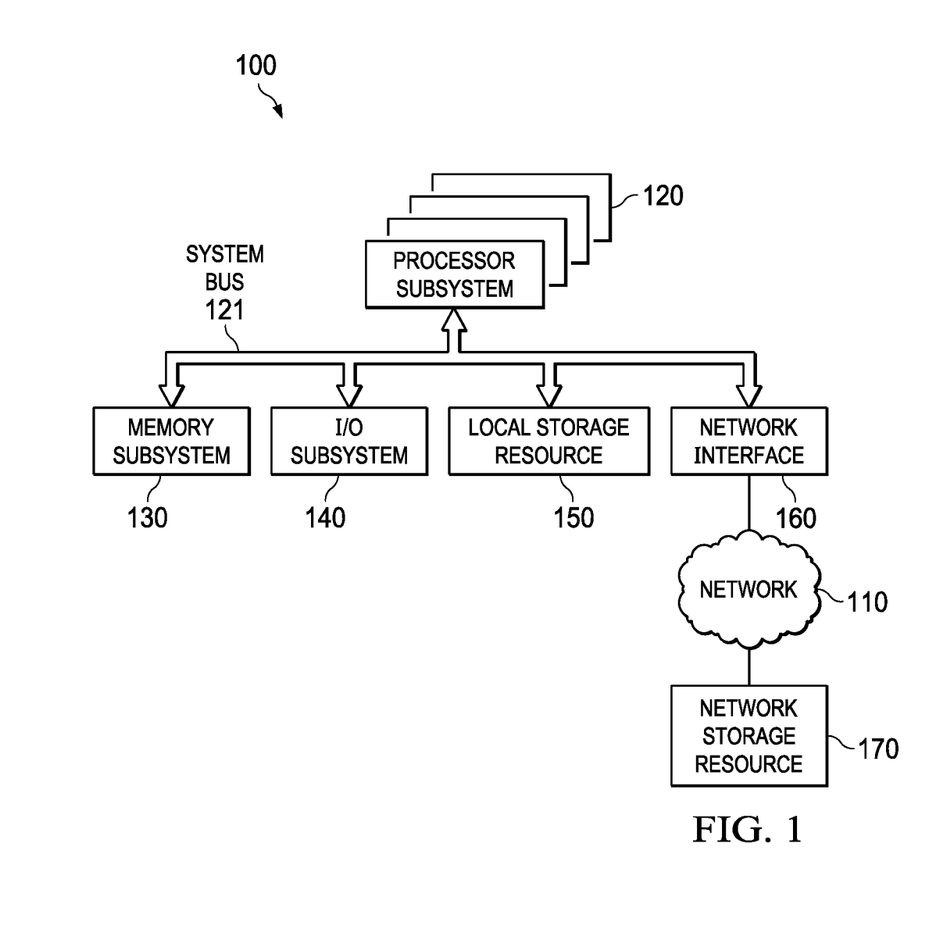
FIG. 1 is a block diagram of selected elements of an embodiment of an information handling system.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

Figure 2:
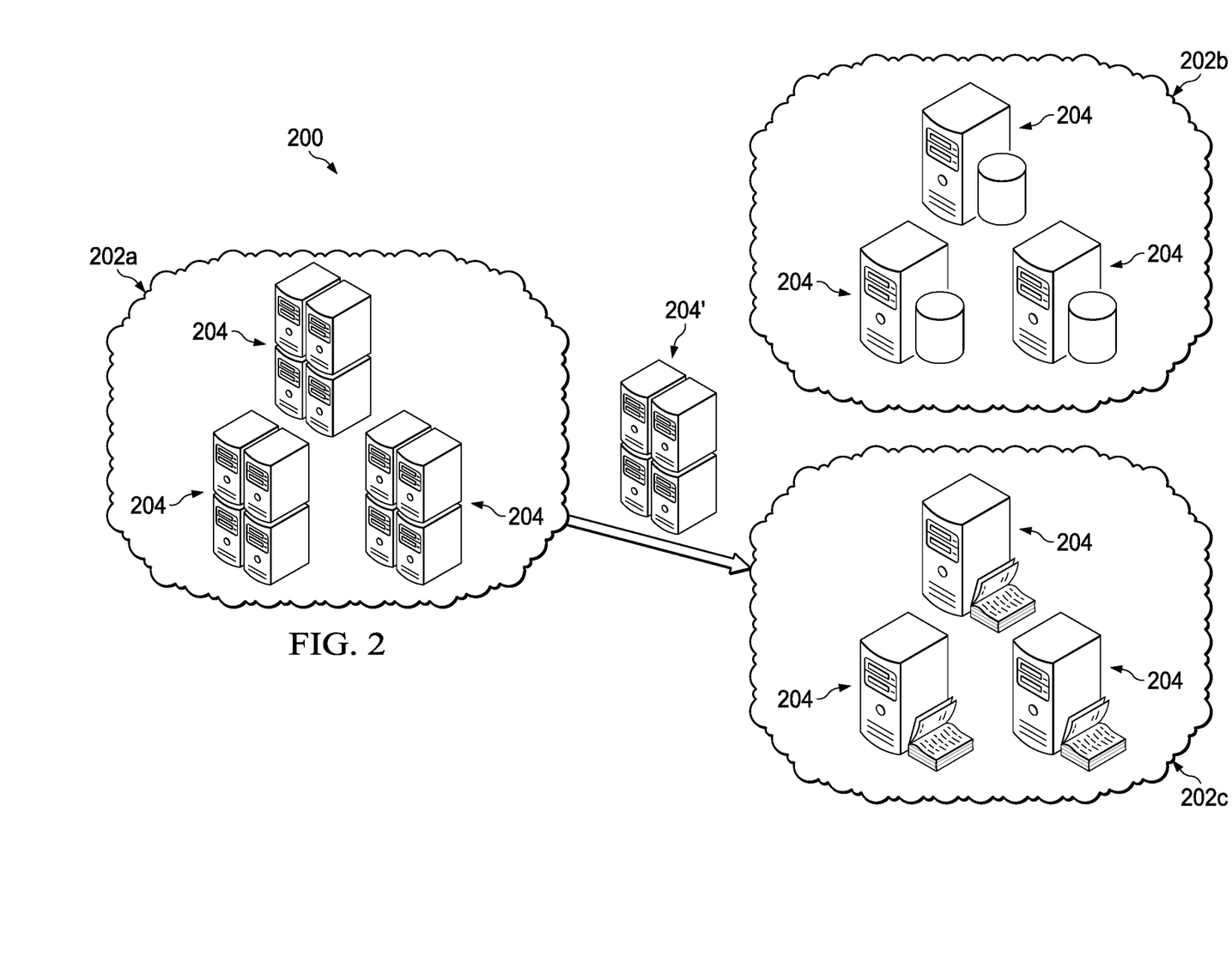
FIG. 2 illustrates a computing environment of secure boot certificate namespaces.

Turning now to FIG. 2, FIG. 2 illustrates a computing environment 200. The computing environment 200 includes a first secure boot namespace 202a, a second secure boot namespace 202b, and a third secure boot namespace 202c (collectively referred to as secure boot namespaces 202). Each of the namespaces 202 can include one or more server computing systems 204. In some examples, a particular server computing system 204' can be moved from the first secure boot namespace 202a to the third secure boot namespace 202c. Any of the server computing systems 204 can be similar to the information handling system 100 of FIG. 1.

In short, the secure boot namespaces 202 can be part of a secure boot certificate namespace hierarchy that is managed by distributed nodes (e.g., a block chain infrastructure). The dynamic representation of a secure boot namespace hierarchy can be integrated (associated) with different configurations based upon the application desired. For example, such configurations can be based on one or more of the following: i) virtual storage area network (vSAN) data store, ii) virtual machine software policy-based management (SPBM), iii) cloud configuration, iv) geography, v) organization chart (e.g., sales, marketing, research and development); vi) server generation type (e.g., 12G, 13G, 14G), vii) virtualization deployment model, and viii) operations system. Each server computing system 204 can be associated with one (at max) of the secure boot namespaces 202. The resultant secure boot namespace 202 can be formed by overlaying multiple relevant secure boot namespaces 202 selected for the respective server computing systems 204. Specifically, each secure boot namespace 202 is given protected/limited access such that each server computing system 204 (or virtual machine) can access and manage the secure boot namespace 202 that it is associated with (included by). That is, the respective server computing system 204 can add/remove certificates or change the parent namespaces for only the secure boot namespace 202 the server computing system 204 is associated with (or included by). For example, only a user with administrative privileges will have access to manage the secure boot namespaces 202.

Figure 3:
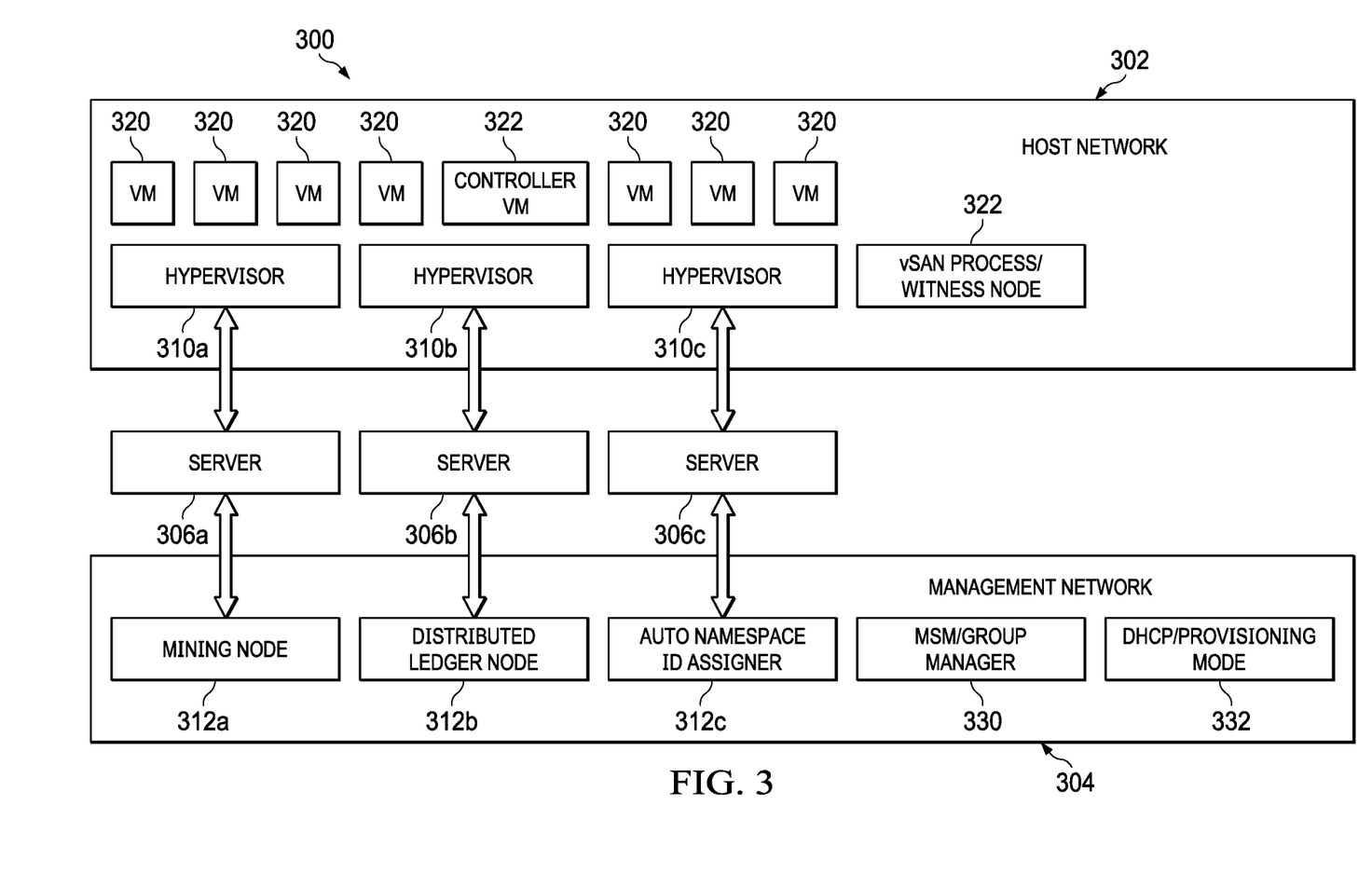
FIG. 3 illustrates a computing environment for management of secure boot certificates.

FIG. 3 illustrates a computing environment 300 for management of secure boot certificates. The environment 300 can include a host network 302, a management network 304, a first server computing system 306a, a second server computing system 306b, and a third server computing system 306c (collectively referred to as server computing systems 306). The environment 300 can include any number of server computing systems 306 depending on the application desired, and any of the server computing systems 306 can be similar to the information handling system 100 of FIG. 1 and/or the server computing systems 204 of FIG. 2.

The server computing systems 306 can be in communication with the host network 302 and the management network 304. Specifically, the server computing systems 306 can be in communication with respective hypervisors 310 (hypervisors 310a, 310b, 310c) of the host network 302 using a unified extensible firmware interface (UEFI) and/or advanced configuration and power interface (ACPI). The host network 302 can further include virtual machines (VMs) 320 that are associated with respective server computing systems 306 and a controller virtual machine (VM) node 322. The host network 302 can further include a vSAN process/witness computing node 324.

The server computing systems 306 can further be in communication with respective remote access controllers 312 such as Dell remote access controllers (DRAC) or integrated Dell remove access controllers (iDRAC) using shared memory access (SMA) or iDRAC service module (iSM). For example, the controllers 312 can represent a mining computing node 312a, a distributed ledger (blockchain) computing node 312b, and an auto namespace ID assigner computing node 312c. The management network 304 can further include a MSM/group manager computing node 330 and a dynamic host configuration protocol (DHCP)/provisioning computing node 332. The mining computing node 312a can facilitate creating a secure boot namespace and managing the same.

In summary, the environment 300 facilitates exposing a list of available secure boot namespaces (such as secure boot namespaces 202), e.g., to a customer/authorized user, to associate a server computing system 306 to a namespace ID or assign certificates to the secure boot namespace to create a new secure boot namespace. Specifically, the mining computing node 312a can manage the secure boot namespace (e.g., secure boot namespaces 202) and derive efficient certificates based on proposed cardinality and override procedures, described further herein. The hypervisors 310 (or BIOS) can pass the namespace identifier (ID) to the server computing systems 306, and the controllers 312 can return certificates to the BIOS through SMA or to the hypervisors 310. A namespace ID assignor can be based on the configuration need, and can be any of the vSAN node 324, the controller VM node 322, the DHCP computing node 332, and the group manager computing node 330 to assign a particular secure boot namespace for the applicable sub-set. Specifically, once a secure boot namespace ID is assigned, a server computing system 306 (or VM 320) can obtain a required effective certificate though the mining computing node 312a managing a namespace database (from a blockchain consensus) responsible for the particular namespace.

Figure 4:
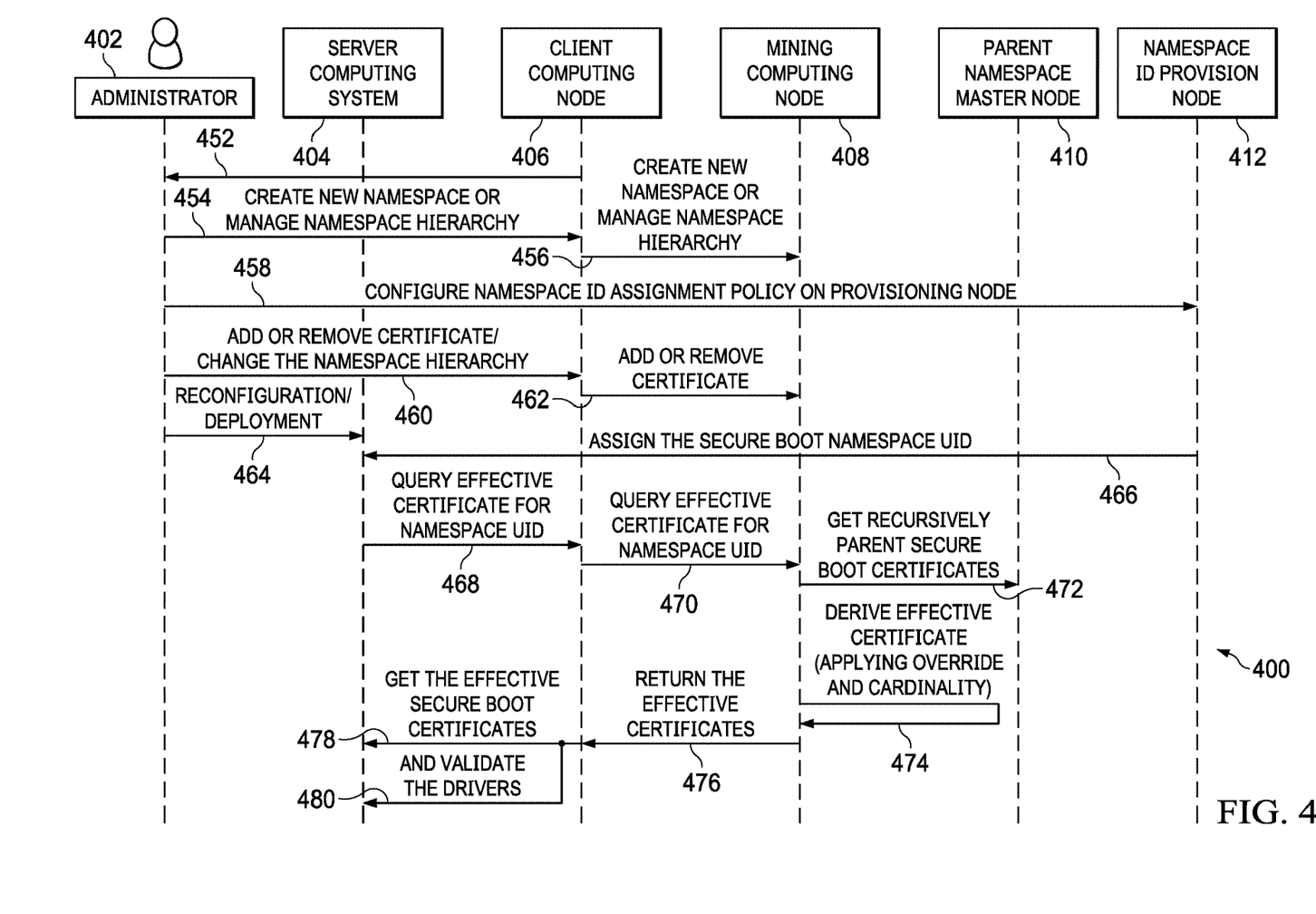
FIG. 4 illustrates a swim-lane diagram for management of secure boot certificates.

FIG. 4 illustrates a swim-lane diagram 400 for management of secure boot certificates. The diagram 400 represents a user (or administrator) 402, a server computing system (or VM) 404 (such as server computing system 306 or VM 320), a client computing node 406 (such as a controller 312), a mining computing node 408 (such as mining computing node 312a), a parent namespace master node 410 (such as a controller 312), and a namespace ID provision node 412 (such as one of the vSAN node 324, the controller VM node 322, the DHCP computing node 332, and the group manager computing node 330).

At step 452, the client computing node 406 can provide an interface to the administrator 402 that identifies a secure boot certificate namespace hierarchy including a plurality of namespaces (such as secure boot namespaces 202). For example, the client computing node 406 can provide a web-based graphical user interface (GUI) or a redfish application programing interface (API) to enumerate an existing secure boot namespace hierarchy. In some examples, the hierarchy can any type of object that can be managed hierarchically such as certificates, storage management, license management, etc.

At step 454, in response to providing the interface, the client computing node 406 receives, from the administrator 402, a request to create a new namespace within the secure boot namespace hierarchy. For example, the administrator 402 (with administrative privileges) can associate the server computing system 404 to one of the available secure boot namespaces of the hierarchy, or can derive a new secure boot namespace from existing secure boot namespace and associate the same. In some examples, the administrator 402 can add/remove a certificate. In some examples, the request can include a request to update certificates within the secure boot namespace hierarchy.

At step 456, in response to the request, the client computing node 406 forwards, to the mining computing node 408, the request. For example, the client computing node 406 forwards the request to the mining computing node 408 to create a new secure boot namespace or update the certificates in a particular secure boot namespace.

At step 458, the new namespace is configured. For example, the administrator 402 can configure the secure boot namespace ID provision using any network node such as the DHCP computing node 332, or the group manager computing node 330; or any software entity such as the controller VM node 322 or the vSAN node 324.

At step 460, a certificate can be added that is to be included by the new namespace. The certificate can be associated with the server computing system 404 (or VM 404). For example, once the new namespace is configured, the administrator 402 can move the server computing system 404 to a new configuration, or a new virtual machine is created/migrated into a new host. In other words, after adding the certificate to the new namespace, the server computing system 404 can be initialized by assigning a particular namespace ID. In some examples, a certificate can be removed from an existing namespace.

At 462, the client computing node 406 forwards the request for adding/removing of the certificate to the mining computing node 408.

At 464, the administrator 402 can reconfigure the deployment. For example, the administrator 402 has the possibility of adding or removing a certificate for an appropriate secure boot namespace, or migrating the server computing system 404 between secure boot namespaces.

At 466, the namespace ID provision node 412 assigns the new namespace to the server computing system 404 (or the virtual machine 404). For example, the namespace ID provision node 412 assigns the secure boot namespace UID to the server computing system 404 (or the virtual machine 404).

At 468, the server computing system 404 queries the client computing node 406 for an effective certificate for the new secure boot namespace. For example, the BIOS of the server computing system 404 or the BIOS of the VM 404 queries the client computing node 406 passing the secure boot namespace UID. In some examples, the effective certificate is derived based on a cardinality value and an override procedure of the secure boot certificate namespace hierarchy, described further herein.

At 470, the mining computing node 408 receives, from the client computing node 406, the query for the effective certificate for the new namespace. For example, the client computing node 406 forwards the request to the mining computing node 408.

At 472, the mining computing node 408 recursively obtains a set of secure boot certificates of the secure boot namespace hierarchy. For example, the mining computing node 408 enumerates all of the parent secure boot namespaces recursively and obtains the associated secure boot certifications for each section.

At 474, the mining computing node 408 derives the effective certificate from the set of secure boot certificates. For example, the mining computing node 408 derives the effective secure booth certificate for each section based on a cardinality of override procedure.

At 476, the mining computing node 408 provides the effective certificate to the client computing node 406.

At 478, the client computing node 406 provides the effective certificate to the server computing system 404. For example, the client computing node 406 provides the effective certificate back to the server BIOS and/or the virtual machine BIOS.

At 480, in response to receiving the effective certificate, the server computing system 404 validates drivers against the effective certificate and boots an operating system of the server computing system 404.

In some examples, a blockchain infrastructure can be implemented within the computing environment 300. Specifically, blockchain can protect any malicious changes in the certificate store by the inherent consensus mechanism provided by the blockchain. For example, when an attempt to enroll a malicious certificate (that can potentially impact every child node or nodes which are part of the same secure boot namespace), the attempt can be blocked. Specifically, consensus is obtained from all participates of the blockchain making sure that the certificate being enrolled is authenticated by all and reached to a consensus to add it to the secure boot namespace.

Figure 5:
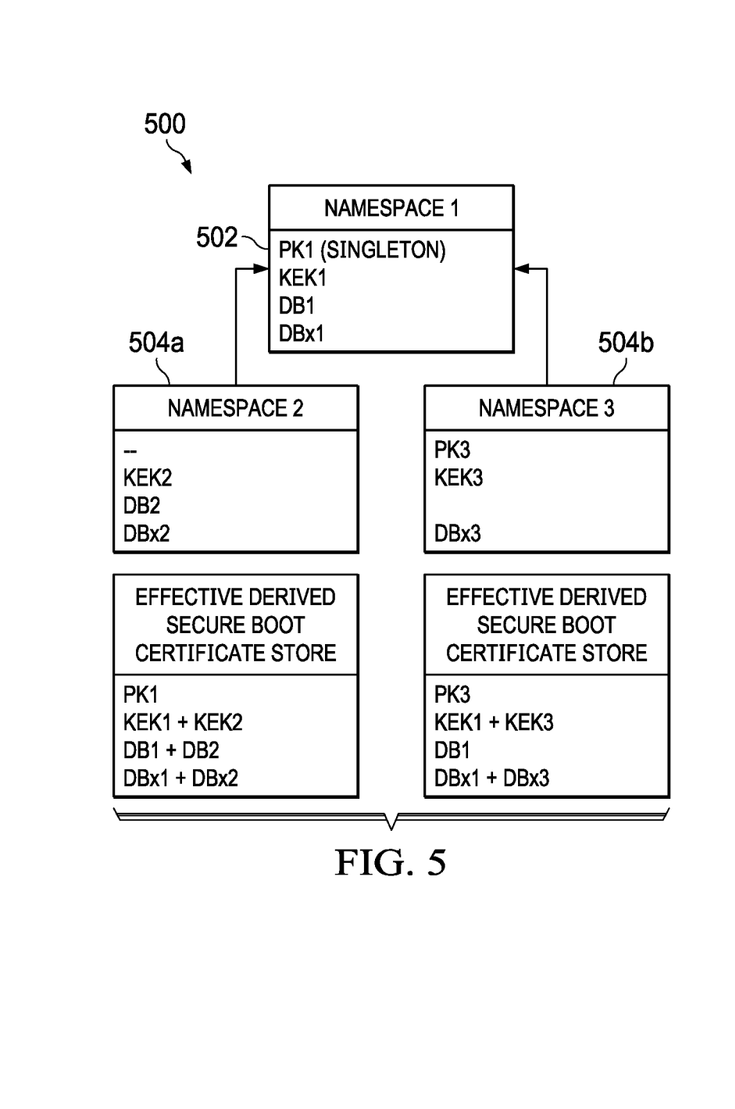
FIGS. 5-7 illustrates a secure boot namespace hierarchy.

FIG. 5 illustrates a secure boot namespace hierarchy 500. The hierarchy 500 includes a parent namespace 502 and child namespaces 504a, 504b. Each of the namespaces consist of four sections—a platform key (PK) section, a key exchange key (KEK) section, an authorized signature database (DB) section, and a forbidden signature database (DBx) section. Any server computing system or virtual machine (such as server computing system 404 or VM 404) can be a part of a particular secure boot namespace and perform operations (such as add/remove certificates) with respect to the sections and change the hierarchy by reassigning the parent namespace. In some examples, a new namespace can be inserted in between the existing hierarchy by changing the parent of the child namespace and assigning the new parent's parent namespace to an existing grandparent namespace. For example, the child namespaces 504a, 504b can be derived from the parent namespace 502. The effective KEK is based on KEK1 and KEK2, as KE1 is not signed by PK2. Thus, the chain of trust is broken, and the DB1 certificate is signed by KEK1 will not qualify.

Figure 6:
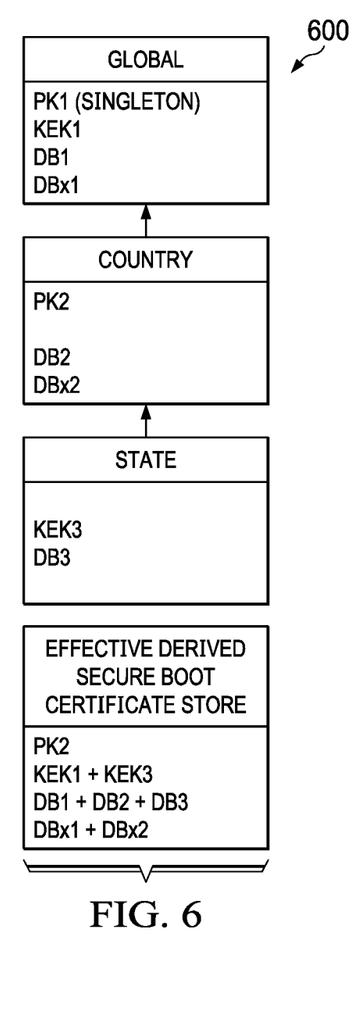

FIG. 6 illustrates a secure boot namespace hierarchy 600 (geography-based). Specifically, the PK section can have the cardinality value of one (singleton) which denotes that the respective child namespace will overwrite the PK certificate of the parent namespace. Other sections will have a cardinality value of N where the child namespace will act as a union set operation and effective result will be a summation.

Figure 7:
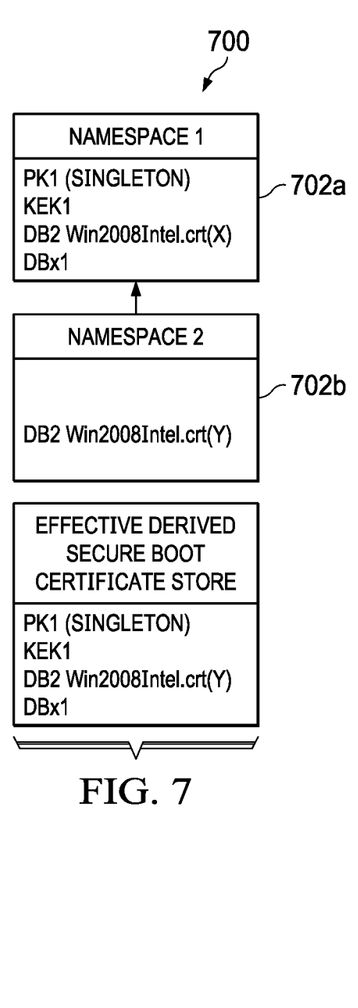

FIG. 7 illustrates a secure boot namespace hierarchy 700. Specifically, if the filename is the same, then the child namespace will take higher priority and the file contents of the child namespace will be effective. For example, the certificate with the file name "Win2008Intel.crt" that is present both namespaces 702a, 702b but the values of X and Y, respectfully, differ. As namespace 702b is a child, the contents of the namespace 702b will be visible in the secure boot certificate store, i.e., the value of Y will be used.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computer-implemented method, comprising:
providing, by a client computing node, an interface identifying a secure boot certificate namespace hierarchy including a plurality of namespaces;
in response to providing the interface, receiving, by the client computing node, a request to create a new namespace within the secure boot namespace hierarchy;
configuring the new namespace, including adding a certificate that is to be included by the new namespace, the certificate associated with a server computing system; and
assigning the new namespace to the server computing system.

2. The computer-implemented method of claim 1, further comprising:
in response to the request, forwarding, by the client computing node, the request to a mining computing node.

3. The computer-implemented method of claim 2, further comprising:
  querying, by the server computing system, an effective certificate for the new namespace;
  receiving, by the mining computing node, the query for the effective certificate for the new namespace;
  recursively obtaining, by the mining computing node, a set of secure boot certificates of the secure boot namespace hierarchy; and
  deriving, by the mining computing node, the effective certificate from the set of secure boot certificates.

4. The computer-implemented method of claim 3, further comprising:
  providing, by the mining computing node, the effective certificate to the client computing node;
  providing, by the client computing node, the effective certificate to the server computing system; and
  in response to receiving the effective certificate, validating, by the server computing system, drivers against the effective certificate and boot an operating system of the server computing system.

5. The computer-implemented method of claim 3, wherein the effective certificate is derived based on a cardinality value and an override procedure of the secure boot certificate namespace hierarchy.

6. The computer-implemented method of claim 1, wherein the request can include a request to update certificates within the secure boot namespace hierarchy.

7. The computer-implemented method of claim 1, further comprising:
  configuring the new namespace, including adding a certificate that is to be included by the new namespace, the certificate associated with a virtual machine; and
  assigning the new namespace to the virtual machine.

8. A system comprising a processor having access to memory media storing instructions executable by the processor to perform operations comprising:
  providing an interface identifying a secure boot certificate namespace hierarchy including a plurality of namespaces;
  in response to providing the interface, receiving a request to create a new namespace within the secure boot namespace hierarchy;
  configuring the new namespace, including adding a certificate that is to be included by the new namespace, the certificate associated with a server computing system; and
  assigning the new namespace to the server computing system.

9. The system of claim 8, the operations further comprising:
  querying an effective certificate for the new namespace;
  receiving the query for the effective certificate for the new namespace;
  recursively obtaining a set of secure boot certificates of the secure boot namespace hierarchy; and
  deriving the effective certificate from the set of secure boot certificates.

10. The system of claim 9, the operations further comprising:
  providing the effective certificate to the server computing system; and
  in response to receiving the effective certificate, validating drivers against the effective certificate and boot an operating system of the server computing system.

11. The system of claim 9, wherein the effective certificate is derived based on a cardinality value and an override procedure of the secure boot certificate namespace hierarchy.

12. The system of claim 8, wherein the request can include a request to update certificates within the secure boot namespace hierarchy.

13. The system of claim 8, the operations further comprising:
  configuring the new namespace, including adding a certificate that is to be included by the new namespace, the certificate associated with a virtual machine; and
  assigning the new namespace to the virtual machine.

14. A non-transitory computer-readable medium storing software comprising instructions executable by one or more computers which, upon such execution, cause the one or more computers to perform operations comprising:
  providing an interface identifying a secure boot certificate namespace hierarchy including a plurality of namespaces;
  in response to providing the interface, receiving a request to create a new namespace within the secure boot namespace hierarchy;
  configuring the new namespace, including adding a certificate that is to be included by the new namespace, the certificate associated with a server computing system; and
  assigning the new namespace to the server computing system.

15. The computer-readable medium of claim 14, the operations further comprising:
  querying an effective certificate for the new namespace;
  receiving the query for the effective certificate for the new namespace;
  recursively obtaining a set of secure boot certificates of the secure boot namespace hierarchy; and
  deriving the effective certificate from the set of secure boot certificates.

16. The computer-readable medium of claim 15, the operations further comprising:
  providing the effective certificate to the server computing system; and
  in response to receiving the effective certificate, validating drivers against the effective certificate and boot an operating system of the server computing system.

17. The computer-readable medium of claim 15, wherein the effective certificate is derived based on a cardinality value and an override procedure of the secure boot certificate namespace hierarchy.

18. The computer-readable medium of claim 14, wherein the request can include a request to update certificates within the secure boot namespace hierarchy.

* * * * *